UNITED STATES PATENT OFFICE.

WALTER KÖNIG, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AZO DYE.

No. 899,171.  Specification of Letters Patent.  Patented Sept. 22, 1908.

Application filed May 12, 1908. Serial No. 432,388.

*To all whom it may concern:*

Be it known that I, WALTER KÖNIG, doctor of technical arts, chemist, citizen of the German Empire, residing at Elberfeld, Germany, Kingdom of Prussia, have invented new and useful Improvements in New Azo Dyes, of which the following is a specification.

My invention relates to the preparation of new azo-dyestuffs. They are obtained by combining in alkaline solution the diazo-compounds of naphthylamin compounds with 1-amino-7-naphthol-4-sulfonic acids having the following general formula:

(X and Y stand for hydrogen or a substituent *e. g.* benzyl, methyl, ethyl etc.)

The new dyestuffs are in the shape of their alkaline salts dark powders soluble in water; yielding upon reduction with stannous chlorid and hydrochloric acid naphthylamin compounds and 1.8-diamino-7-naphthol-4-sulfonic acid compounds of the formula

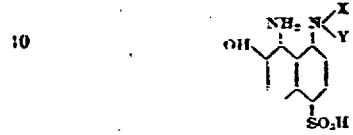

(X and Y stand for hydrogen or a substituent). They are acid dyeing colors of strong covering power, producing on wool very level violet to deep black shades of good fastness to washing. The cotton in mixed cotton and woolen goods is not dyed by the new colors.

In carrying out the new process practically I can proceed as follows, the parts being by weight: 14,3 parts of 1 naphthylamin are diazotized in the usual manner by means of hydrochloric acid and 7 parts of sodium nitrite. The diazo compound is then added to a solution which has to be stirred of 26,1 parts of the sodium salt of 1-amino-7-naphthol-4-sulfonic acid with an excess of sodium carbonate. The dyestuff separates at once. It is filtered off, pressed and dried. It is, after being dried and pulverized, in the shape of its sodium salt a dark powder soluble in water with a red-violet color and soluble in concentrated sulfuric acid with a greenish-blue color. By reduction with stannous chlorid and hydrochloric acid 1-naphthylamin and 1,8-diamino-7-naphthol-4-sulfonic acid are obtained.

The new dyestuff dyes wool from acid baths violet-black shades of a reddish tint.

The process is carried out in an analogous manner on using other of the above mentioned diazo compounds or on using alkylated 1-amino-7-naphthol-4-sulfonic acids.

In the following table the shades on wool of some of the new dyestuffs are given:

| | | |
|---|---|---|
| 1) 1-naphthylamin | 1.7-amino-naphthol-4-sulfonic acid | Violet-black of a reddish tint |
| 2) 1-naphthylamin-2-sulfonic acid | | Deep brown-red |
| 3) 1-naphthylamin-4-sulfonic acid | | Black |
| 4) 2-naphthylamin | | Deep reddish-violet |
| 5) 1-naphthylamin+1-dimethylamino-7-naphthol-4-sulfonic acid | | Bluish-black |
| 6) 1-naphthylamin+1-monobenzylamino-7-naphthol-4-sulfonic acid | | Bluish-black |

The alkylated derivatives can be obtained by treating 1-amino-7-naphthol-4-sulfonic acid with halogen alkyls or dialkyl sulfates and sodium acetate etc.

Having now described my invention and in what manner the same is to be performed, what I claim as new and desire to secure by Letters Patent is:—

1. The herein-described new azo dyestuffs, obtainable by combining in alkaline solution naphthylamin compounds with 1-amino-7-naphthol-4-sulfonic acids having the above given formula, which dyestuffs are, after being dried and pulverized, in the shape of their alkaline salts dark powders soluble in water; yielding upon reduction with stannous chlorid and hydrochloric acid naphthylamin compounds and 1.8-diamino-7-naphthol-4-sulfonic acids having the formula

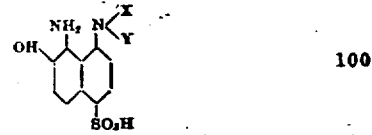

and dyeing wool from acid baths generally from violet to black shades, substantially as described.

2. The herein-described new azodyestuff obtainable by combining in alkaline solution the diazocompound of 1-naphthylamin with 1-Amino-7-naphthol-4-sulfonic acid, which dyestuff is, after being dried and pulverized, in the shape of its sodium salt a dark powder soluble in water with a red-violet color and soluble in concentrated sulfuric acid with a greenish-blue color; yielding upon reduction with stannous chlorid and hydrochloric acid 1-naphthylamin and 1.8-diamino-7-naphthol-4-sulfonic acid; and dyeing wool from acid baths violet-black shades of a reddish tint, substantially as described.

In testimony whereof I have hereunto set my hand in the presence of two subscribing witnesses.

WALTER KÖNIG. [L. S.]

Witnesses:
OTTO KÖNIG,
WM. WASHINGTON BRUNSWICK.